United States Patent
Bergstrom et al.

[15] 3,691,216
[45] Sept. 12, 1972

[54] PGE$_2$ METHYL ESTER AND PGE$_2$ METHYL ESTER DIACETATE

[72] Inventors: Sune Bergstrom; Jan Sjovall, both of Kemiska Institutionen, Karulinska Institutet, Stockholm 60, Sweden

[22] Filed: Feb. 12, 1971

[21] Appl. No.: 115,112

Related U.S. Application Data

[63] Continuation-in-part of Ser. No. 203,752, June 20, 1962, Pat. No. 3,598,858, which is a continuation-in-part of Ser. No. 199,209, April 9, 1962, abandoned, which is a continuation-in-part of Ser. No. 738,514, May 28, 1958, Pat. No. 3,069,323.

[30] Foreign Application Priority Data

March 29, 1962 Great Britain..........12,139/62

[52] U.S. Cl. ..........................260/468 R, 260/488 R
[51] Int. Cl. ...............................................C07c 69/74
[58] Field of Search......................260/468, 514, 488

[56] References Cited

OTHER PUBLICATIONS

Samuelsson, J. Biol. Chem. 238. 3229 (1963)
Bergstrom et al. Arkiv for Kemi 19, 563. ( 1962)

*Primary Examiner*—Lorraine A. Weinberger
*Assistant Examiner*—Robert Gerstl
*Attorney*—Earl C. Spaeth and John Kekich

[57] ABSTRACT

The prostaglandins PGE$_2$ methyl ester and PGE$_2$ methyl ester diacetate are disclosed. These novel compounds are useful for a variety of pharmacological purposes, including use as smooth muscle stimulants and as cardiovascular agents.

3 Claims, No Drawings

PGE METHYL ESTER AND PGE METHYL ESTER DIACETATE

CROSS REFERENCE TO RELATED APPLICATIONS

This application is a continuation-in-part of our copending application Ser. No. 203,752, filed June 20, 1962, now U.S. Pat. No. 3,598,858, which is a continuation-in-part of our copending application Ser. No. 199,209, filed Apr. 9, 1962, now abandoned, which is a continuation-in-part of our copending application Ser. No. 738,514, filed May 28, 1958, now U.S. Pat. No. 3,069,322.

DESCRIPTION OF THE INVENTION

This invention relates to novel compositions of matter, and is more specifically concerned with novel organic compounds of the formula:

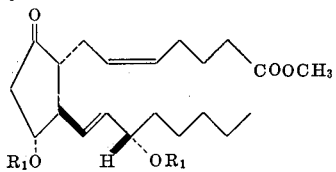

I wherein $R_1$ is hydrogen or acetyl, said compound being essentially free of the other components of colonies of the subclass Octocorallia. Included in formula I are compounds of the formulas:

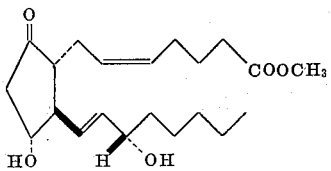

II

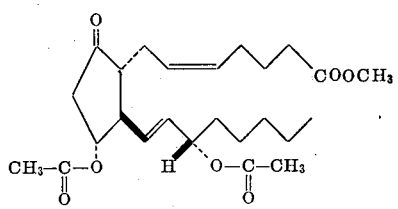

III

Molecules of the compounds encompassed by formulas I, II, and III each have several centers of asymmetry. Formulas I, II, and III are intended to represent optically active compounds each with the same absolute configuration as optically active prostaglandin E (PGE), later named prostaglandin $E_1$ ($PGE_1$), and obtained from certain mammalian tissues, for example, sheep vesicular glands. See our said U.S. Pat. No. 3,069,322. See also later publications, for example, Bergstrom et al., J. Biol. Chem. 238, 3555 (1963), Bergstrom et al., Pharmacol. Rev. 20, 1 (1968), and references cited in those.

In formulas I, II, and III, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in formulas I, II, and III is S.

A systematic name for the compound of formula II is the methyl ester of 7-[3α-hydroxy-2β-[(3S)-3-hydroxy-trans-1-octenyl]-5-oxo-1α-cyclopentyl]-cis-5-heptenoic acid. For convenience, this compound is designated $PGE_2$ methyl ester.

A systematic name for the compound of formula III is the methyl ester diacetate of 7-(3α-hydroxy-2β-[(3S)-3-hydroxy-trans-1-octenyl]-5-oxo-1α-cyclopentyl]-cis-5-heptenoic acid. For convenience, this compound is designated $PGE_2$ methyl ester diacetate.

$PGE_2$ was previously named bisdehydro-PGE. See our said copending application Ser. No. 203,752.

The novel compounds of formulas I, II, and III, i.e., $PGE_2$ methyl ester and $PGE_2$ methyl ester diacetate, are extremely potent in causing stimulation of smooth muscle as shown, for example by tests on strips of guinea pig ileum, rabbit duodenum, or gerbil colon. These compounds are also highly active in potentiating other known smooth muscle stimulators, for example, oxytocic agents, e.g., oxytocin and the various ergot alkaloids including derivatives and analogs thereof. Accordingly, these novel formula I, II, and III compounds are useful in place of or in combination with less than the usual amounts of these and other known smooth muscle stimulators whenever smooth muscle stimulation is needed to alleviate or prevent some physiological condition in mammals, including humans, useful domestic animals, pets, zoological specimens, and laboratory animals, for example, mice, rabbits, rats, and monkeys. For example, these compounds can be used to alleviate or prevent conditions of gastrointestinal atony in mammals, including humans, e.g., paralytic ileus following anesthesia and surgical operation or from other medical causes. For this purpose, the compound is administered parenterally, e.g., subcutaneously, intramuscularly or by intravenous injection or infusion in a dose range 0.1 to 2 mg. per kg. of body weight per day, the exact dose depending on the age, weight, and condition of the patient or animals, and the frequency and route of administration. Small repeated doses are indicated when the aim is to prevent rather than alleviate the atony.

Another smooth muscle stimulatory area where these novel formula I, II, and III, compounds are useful, is in the control or prevention of atonic uterine bleeding in mammals after abortion or delivery, to aid in the expulsion of the placenta, and during the puerperium. For this purpose, the compound is administered by intravenous infusion immediately after abortion or delivery at a dose in the range about 0.1 to about 100 μg. per kg. of body weight per minute until the desired effect is obtained. Subsequent doses are given by intravenous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of formulas I, II, and III are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravaneously at a dose of 0.1 to 100 μg. per kg. of body weight per minute until at or near the termination of the second stage of labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The novel compounds of formulas I, II, and III are also surprisingly useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, a dihydro-$PGE_1$, for example, is administered systemically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, expulsion of an embryo or a fetus is accomplished by similar administration of the compound during the first third of the normal mammalian gestation period.

The novel compounds of formulas I, II, and III are also useful in mammals, including man, as nasal decongestants. For this purpose, the compounds are used in a dose range of about 10 $\mu$g. to about 10 mg. per ml. of a pharmacologically suitable liquid vehicle or as an aerosol spray, both for topical application.

The novel compounds of formulas I, II, and III are also useful in mammals, including man and useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 1 $\mu$g. to about 100 $\mu$g. per kg. of body weight per minute, or in a total daily dose by injection or infusion in the range about one to about 50 mg. per kg. of body weight per day, the exact dose depending upon the age, weight, and condition of the patient or animal, and on the frequency and route of administration.

The novel formula I, II, and III compounds lower systemic arterial blood pressure in anesthetized (pentobarbital sodium) pentolinium-treated rats with indwelling aortic and right heart cannulas. Accordingly, these novel compounds are useful as hypotensive agents to reduce blood pressure in mammals, including man. For this purpose, the compounds are administered by intravenous infusion at the rate about 0.1 to about 100 $\mu$g. per kg. of body weight per minute, or in single or multiple doses of about 100 $\mu$g. to 5 mg. per kg. of body weight total per day.

The novel compounds of formulas I, II, and III are potent antagonists of epinephrine-induced mobilization of free fatty acids as shown, for example, by inhibition of the spontaneous release of glycerol from isolated fat pads. For this reason, these compounds are useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

When the novel formula I, II, and III compounds are used for intravenous injection or infusion, sterile aqueous isotonic solutions are preferred. For subcutaneous or intramuscular injection, sterile solutions or suspensions of the compound in aqueous or non-aqueous media are used. Tablets, capsules, and liquid preparations such as syrups, elixers, and simple solutions, with the usual pharmaceutical carriers, are used for oral or sublingual administration. For rectal, vaginal, or intrauterine administration, suppositories, lavage and douche preparations, and solutions as such or contained in a sponge, all prepared by methods known in the art, are used.

$PGE_2$ methyl ester is prepared by the reaction of the compound known as $PGE_2$ with diazomethane. A suitable procedure for doing that is described below in Example 1.

$PGE_2$ methyl ester diacetate is prepared by the reaction of $PGE_2$ methyl ester with acetic anhydride in the presence of pyridine. A suitable procedure for doing that is described below in Example 2.

The preparation of the reactant $PGE_2$ is described in our said copending application Ser. No. 203,752. The structural formula of $PGE_2$ is as follows:

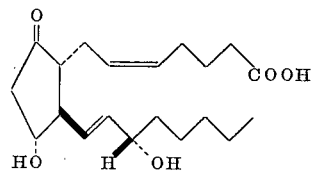

Since our invention of the novel formula I, II, and III compounds, i.e., $PGE_2$ methyl ester and $PGE_2$ methyl ester diacetate, it has been discovered that certain other prostaglandins, i.e., the prostaglandins known as $PGA_2$, $PGA_2$ methyl ester, and $PGA_2$ methyl ester acetate are obtained by extraction of colonies or colony pieces of the marine invertebrate *Plexaura homomalla* (Esper), 1791, forma S, and separating one, two, or all of those $PGA_2$ compounds from the resulting extract.

The structural formula of $PGA_2$ is now known to be:

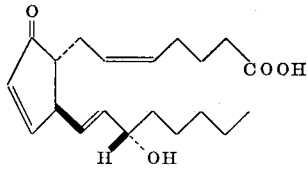

IV

*Plexaura homomalla* (Esper), 1792, forma S is a member of the subclass Octocorallia, order Gorgonacea, suborder Holaxonia, family Plexauridae, genus Plexaura. See, for example, Bayer, "The Shallow-Water Octocorallia of the West Indian Region," Martinus Nijhoff, The Hague (1961). Colonies of these *Plexaura homomalla* forms are abundant on the ocean reefs in the zone from the low-tide line to about 25 fathoms in the tropical and subtropical regions of the western part of the Atlantic Ocean, from Bermuda to the reefs of Brazil, including the eastern shore reefs of Florida, the Caribbean island and mainland reefs, and the Gulf of Mexico island and mainland reefs. These colonies are bush-like or small tree-like in habit, and are readily identified for collection as *Plexaura homomalla* (Esper), 1792, by those of ordinary skill in this art.

Although $PGA_2$, $PGA_2$ methyl ester, and $PGA_2$ methyl ester acetate, or one or two of those appear to be the predominate prostaglandin-like components of this particular member of the Octocorallia subclass, it has now been found that small amounts of $PGE_2$ methyl ester (formula II) are also obtained from this same Plexaura homomalla (Esper), 1792, forma S. This is shown, for example, by the experiment described in Preparation 1, below. It has not yet been conclusively shown that $PGE_2$ methyl ester diacetate is present or obtainable from this same member or another member of the Octocorallia subclass, but since $PGA_2$ methyl ester acetate has been obtained from this source, it seems possible that $PGE_2$ methyl ester diacetate will also be present or obtainable from the same source.

When $PGE_2$ methyl ester and, if possible, $PGE_2$ methyl ester diacetate, are obtained from a member of the Octocorallia subclass, e.g., *Plexaura homomalla* (Esper), 1792, forma S, and are intended for one or more of the above-described pharmacological uses, these compounds must, of course, be obtained essentially free of the other components of colonies of the subclass Octocorallia. By the term "essentially free" here is meant a degree of freedom from these other components except, of course, water, such that the $PGE_2$ methyl ester and $PGE_2$ methyl ester diacetate are suitable for their intended pharmacological uses, including parenteral administration to humans. When these two compounds are essentially free of these other components of the subclass Octocorallia, they are considered to be essentially pure and useable for all of the above-described pharmacological uses.

In obtaining essentially pure $PGE_2$ methyl ester and, if possible, essentially pure $PGE_2$ methyl ester diacetate, from colonies of the subclass Octocorallia, it is important that these compounds be essentially free, as that term is defined above, from other prostaglandin-like compounds. For example, the $PGA_2$-type compounds which are likely to be present in the same colonies have different spectra of biological activity and, if present as contaminants, are likely to intefere with the above-described pharmacological uses of the $PGE_2$ methyl ester and $PGE_2$ methyl ester diacetate. This degree of purity is readily obtained, especially in the case of $PGA_2$-type contaminants. There are substantial differences in polarity among the various prostaglandins. For example, PGA-type prostaglandins are less polar then PGE-type prostaglandins. Advantage is easily taken of these differences by using silica gel chromatography, either preparative thin layer or column. A procedure for separating the various $PGA_2$-type compounds which may be present in a member of the subclass Octocorallia from the desired $PGE_2$ methyl ester and, if possible, $PGE_2$ methyl ester diacetate, is described in Preparation 2, below. The processes for obtaining $PGA_2$-type compounds and $PGE_2$ methyl ester from *Plexaura homomalla* (Esper), 1792, forma S described in Preparations 1 and 2 below, are not part of our invention. Rather, our invention is the novel and useful compounds of formulas I, II, and III regardless of how those are prepared.

The invention can be more fully understood by the following examples.

EXAMPLE 1 $PGE_2$ METHYL ESTER

To a dry ether solution of 1 milligram of $PGE_2$ is added a slight excess of diazomethane, prepared in ether from 4 micromoles of nitrosomethylurethane. The reaction mixture is allowed to stand for about 5 minutes, and the ether and excess diazomethane distilled off. On distillation to dryness, $PGE_2$ methyl ester is obtained; mass spectral peaks at 348, 330, 317, 299, 277, 259, and 190 mass spectral units.

EXAMPLE 2 $PGE_2$ METHYL ESTER DIACETATE

A mixture of $PGE_2$ methyl ester (100 mg.), acetic anhydride (1 ml.), and pyridine (4 ml.) is stirred 2.5 hours at 25° C. This mixture is then poured into a mixture of ice and 40 ml. of 1.2 molar hydrochloric acid. This mixture is rapidly extracted with dichloromethane. The extract is washed successively with one molar hydrochloric acid and aqueous sodium bicarbonate solution, dried with anhydrous sodium sulfate, and evaporated under reduced pressure to give $PGE_2$ methyl ester diacetate in the form of a viscous oil.

PREPARATION 1 $PGE_2$ METHYL ESTER

Colonies of *Plexaura homomalla*(Esper), 1792, forma S collected both from reefs off the north shore of Jamaica and from reefs off the shore of Grand Cayman Island are chopped into chunks several inches long. The chunks are frozen by contact with solid carbon dioxide within 1 hour after removal from the reef waters. The frozen colonies are maintained in insulated boxes containing solid carbon dioxide (temperature below about −20° C.) until the time for extraction.

A 10-gram portion of frozen Jamaican colonies is ground with 125 ml. of acetone for 5 minutes in a Waring-type blender. The resulting slurry is filtered through a pad of diatomaceous earth (Celite), and the filtrate is concentrated to a 10-ml. volume under reduced pressure. This procedure is repeated with a ten-gram portion of frozen Grand Cayman Island colonies. 50 microliters of each concentrated filtrate are spotted separately on a TLC silica gel plate. Solutions of $PGE_2$ methyl ester (Example 1) and $PGE_2$ methyl ester diacetate (Example 2) are also spotted separately on the same plate. The plate is developed with the A-IX system. After development, spots are seen in the chromatogram of both colony extracts which correspond exactly to the spots on the $PGE_2$ methyl ester chromatogram. There is uncertainty as to correspondence of the chromatograms of both colony extracts with the spots on the $PGE_2$ methyl ester diacetate chromatogram.

PREPARATION 2 $PGE_2$ METHYL ESTER

Frozen colony pieces (1,500 g.) of Jamaican colonies are ground to a small particle size (Mitts and Merrill hogger; average largest dimension about 5 mm). The particles (1,500 g.) are then stirred at high speed with 5 gallons of dichloromethane for 20 minutes at about 25° C. external temperature. The mixture of dichloromethane and particles is then filtered through a pad of diatomaceous earth, and the filtrate is evaporated to about a 2-liter volume at 30° C. under reduced pressure. The liquid which remains is washed with water, dried with sodium sulfate, and evaporated at 30° C. under reduced pressure. The oily residue (60 g.) is chromatographed on 3 kg. of silica gel wet packed in Skellysolve B (a mixture of isomeric hexanes), eluting successively with a gradient of 4 l. of Skellysolve B and 4 l. of 20 percent ethyl acetate in Skellysolve B, 27 l. of 20 percent, 18 l. of 50 percent, and 8 l. of 75 percent ethyl acetate in Skellysolve B, collecting 600-ml. fractions. Fractions 39–60 are combined and evaporated to give $PGA_2$ acetate methyl ester. Fractions 74–76 are combined and evaporated to give 1.03 g. of $PGA_2$ methyl ester. $PGE_2$ methyl ester diacetate, if present, is obtained from subsequent fractions, and is detected in those fractions by subjecting a small portion of each fraction to thin layer chromatography with an actual $PGE_2$ methyl ester diacetate control as described in Preparation 1. $PGE_2$ methyl ester is obtained by combining and evaporating still later fractions, including fractions resulting from subsequent elution with 100 percent ethyl acetate. $PGE_2$ methyl ester is detected in these subsequent fractions by thin layer chromatography as described for the detection of $PGE_2$ methyl ester diacetate.

What is claimed is:

1. A compound of the formula:

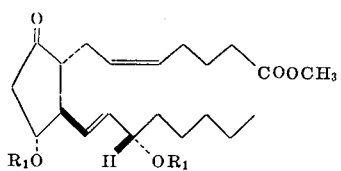

wherein $R_1$ is hydrogen or acetyl, said compound being essentially free of the other components of colonies of the subclass Octocorallia.

2. A compound according to claim 1 wherein both $R_1$ are hydrogen, said compound being the methyl ester of 7-[3α-hydroxy-2β-[(3S)-3-hydroxy-trans-1-octenyl]-5-oxo-1α-cyclopentyl]-cis-5-heptenoic acid.

3. A compound according to claim 1 wherein both $R_1$ are acetyl, said compound being the methyl ester diacetate of 7-[3α-hydroxy-2β-[3S)-3-hydroxy-trans-1-octenyl]-5-oxo-1α-cyclopentyl]-cis-5-heptenoic acid.

* * * * *